United States Patent [19]

Hanemaayer

[11] Patent Number: 5,697,666
[45] Date of Patent: Dec. 16, 1997

[54] THREE-WAY MOVABLE TABLE FOR A RECREATIONAL VEHICLE

[76] Inventor: Jacobus N. Hanemaayer, 100 Shirley Avenue, Kitchener, Ontario, Canada, N2B 2E1

[21] Appl. No.: 647,569

[22] Filed: May 14, 1996

[30] Foreign Application Priority Data

Jun. 2, 1995 [CA] Canada ................................. 2150889

[51] Int. Cl.$^6$ ........................................... B60P 3/34
[52] U.S. Cl. ................. 296/164; 296/156; 108/5; 108/140
[58] Field of Search ........................ 296/164, 168, 296/156; 108/5, 140, 139

[56] References Cited

U.S. PATENT DOCUMENTS

| | | | |
|---|---|---|---|
| 2,193,647 | 3/1940 | Rush et al. | 108/139 |
| 4,605,258 | 8/1986 | Höhn | 296/164 |
| 4,672,898 | 6/1987 | Davidson | 108/139 |
| 4,852,940 | 8/1989 | Kanigowski | 108/140 |

OTHER PUBLICATIONS

ROADTREK Brochure—12 pages undated.
EuroVan Camper—8 pages 1992.
Vanagon/Camper—3 pages undated.
Commander—1 page undated.
Suncruiser—2 pages undated.
Custom Crafted Door—1 page undated.
Mercedes RV—2 pages undated.
Mid America Sales Co., Inc.—2 pages undated.
Three Drop Leaf Tables in One—1 page undated.
Common Sense Design—1 page undated.

*Primary Examiner*—Gary C. Hoge
*Attorney, Agent, or Firm*—Killworth, Gottman, Hagan & Schaeff, L.L.P.

[57] ABSTRACT

A movable table assembly for use in a recreational vehicle or the like and comprising a table blade and a mounting assembly therefor enabling said table blade to be extended and retracted and to be pivoted and rotated about vertical and horizontal axes as desired in order to bring said table blade from a stored position to any one of a plurality of desired positions for use and vice versa.

8 Claims, 9 Drawing Sheets

THREE-WAY MOVABLE TABLE FOR A RECREATIONAL VEHICLE

BACKGROUND OF THE INVENTION

This invention relates to improvements in recreational vehicles and the like and in particular to a three-way movable table assembly specially suitable for a recreational vehicle.

There are several types of recreational vehicles and the present invention is particularly applicable to, although not limited to, camper van conversions which involve the conversion of a commercial cargo van. The majority of these camper van conversions, officially known in the industry as Class B recreational vehicles, are built using extended body commercial cargo vans. However, several of the automotive manufacturers, including General Motors Corporation, make three different lengths of cargo vans, i.e. the short, the standard length and the extended length body, most of these having different wheel base lengths as well. Regardless of the van body size it is of importance that the available space be used efficiently and that multiple use of facilities and spaces be provided wherever practical.

My earlier Canadian Patent No. 1,200,262 issued Feb. 4, 1986 discloses a recreational vehicle wherein the van interior is provided with uniquely designed movable partitions for creating a temporary central toilet area in the van interior. This is a good example of a "space saver" innovation which makes dual use of available space, eliminating the need for a permanent space-wasting fixed bathroom. The interior structures and lay-out described in the above-identified patent can be used in various lengths of cargo vans.

Recreational vehicles of the type under consideration typically have a frontal seating/driving section, a rearwardly disposed sleeping/dining section and an intermediate utility area incorporating kitchen, bathroom and related facilities. These regions or sections are typically accessed by way of a central aisle running longitudinally of the van interior.

The prior art has provided several varieties of movable or collapsible table for use in recreational vehicles. One table in the "old" Volkswagon Camper Van (1991 models and back) only swings out of the way over a counter cabinet; this makes it necessary to remove items thereon first. Another type of table folds down against an exterior wall for storing. The tables of the later models do not swing or pivot and are only removable from their supports for storage purposes. A common type pivots on a single leg (tube) placed off-centre under the table and inserted into the floor, with both ends removable from their associated sockets. A similar two-legged (tubular) type cannot pivot. Another type has one end hinged to a wall or cabinet with the other end supported by a collapsible leg or bracket; some other designs employ folding or sliding mechanisms. Still others are cantilevered from a shallow wall cabinet and are lifted vertically for storing in a slot against the wall in the back of the cabinet. None of these arrangements is considered to be entirely satisfactory.

SUMMARY OF THE INVENTION

It is a basic object of the present invention to provide a stowable table which extends, pivots and rotates into positions for ready use in a recreational vehicle and which improves on the known comparable table systems in terms of ease of use, versatility and simplicity while making full use of the limited space available in a typical recreational vehicle.

A further object of the invention is to provide a table assembly which can be rotated 360 degrees, pivoted approximately 180 degrees and extended from a storage position against a wall or partition to a usable position almost anywhere that might be desired in a central part of the van. No other known table can do all these things.

Accordingly, the invention in one aspect provides a movable table assembly for use in a recreational vehicle or the like and comprising a table blade and a mounting assembly therefor enabling said table blade to be extended and retracted and to be pivoted and rotated about vertical and horizontal axes as desired in order to bring said table blade from a stored position to a desired position for use and vice versa.

In a further aspect of the invention said mounting assembly includes an elongated member to one end of which said table blade is pivotally mounted for movement about a first axis relative to said elongated member. Said elongated member is mounted to a support base for both rectilinear and rotational movement relative thereto to desired positions along and about the longitudinal axis of said elongated member. Means are provided for securing said elongated member relative to said support base in said desired positions.

In one embodiment said first axis about which said table blade is mounted is normal to said longitudinal axis of the elongated member. Preferably said table blade is mounted in an end portion of said elongated member.

In a preferred form of the invention said elongated member has a cylindrical exterior and said means for securing comprises a clamping sleeve surrounding part of said elongated member and means to tighten said clamping sleeve around said elongated member, said clamping sleeve being fixed to said support base.

Preferably said support base is adapted to be mounted to a vertical wall or panel.

The movable table assembly described above is particularly useful in combination with a recreational vehicle, said mounting assembly being secured to a fixed interior portion of said vehicle.

In the combination described above, said recreational vehicle preferably has a frontal driving/seating section having at least a drivers seat and a passenger seat therein, and said table assembly being located to one side of said vehicle such that said table blade may be brought into any of said desired positions for use by occupants of said drivers and/or said passengers seats, both the drivers seat and passengers seat being mounted for rotation about respective vertical swivel axes.

The combination recited above is preferably arranged such that said mounting assembly is secured to a panel or partition positioned to enable said extension and retraction to take place along an axis generally transverse to the longitudinal axis of the vehicle interior such that said table blade may be moved from a stored position parallel to said panel or partition to any one of a plurality of horizontal positions adjacent said seats for convenient use by one or both occupant(s) thereof.

Numerous other features and advantages of the invention will become apparent from the following description and the appended claims.

DETAILED DESCRIPTION OF A PREFERRED EMBODIMENT

Figure 2:
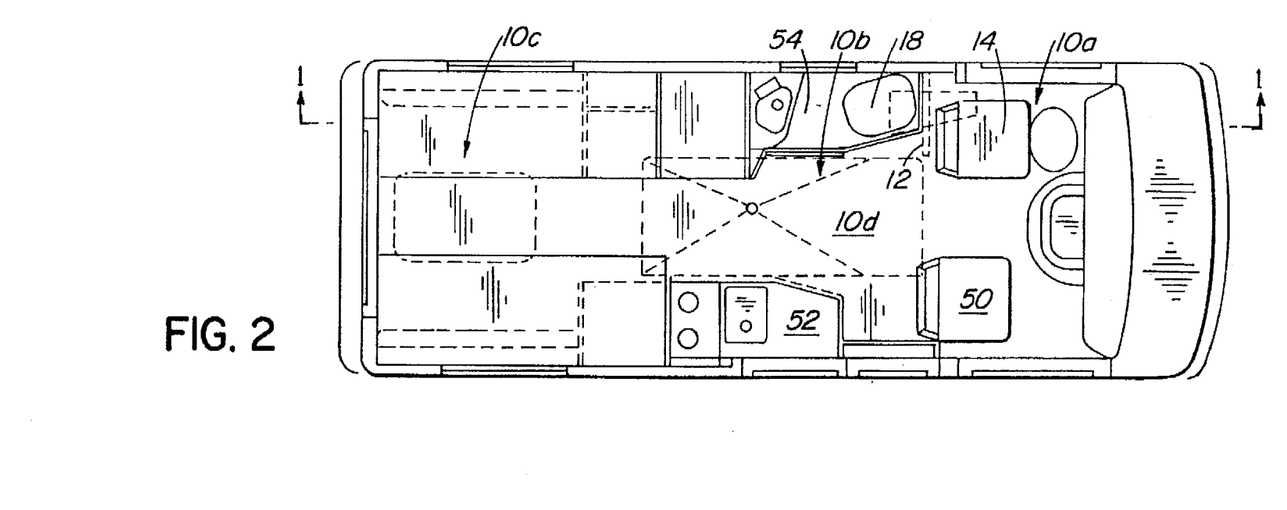
FIG. 2 is a top plan view of the van interior layout, the table blade being in a stored position between the bathroom partition and back of the drivers seat.

Referring firstly to FIG. 2 there is shown a Class B recreational vehicle having three main sections, namely, a forwardly disposed sitting/driving section 10a (having drivers and passengers seats 14, 50 respectively), a centrally disposed section 10b including kitchen and wardrobe facilities and a bathroom 54, and a rearwardly disposed sleeping/sitting/dining section 10c. A longitudinally arranged central aisle 10d extends between and permits access to all of the above-mentioned sections. The central area 10b, opposite the above-mentioned bathroom/wardrobe, includes a kitchen area defined by a sink, a counter 52, a refrigerator and a stove.

Figure 3:
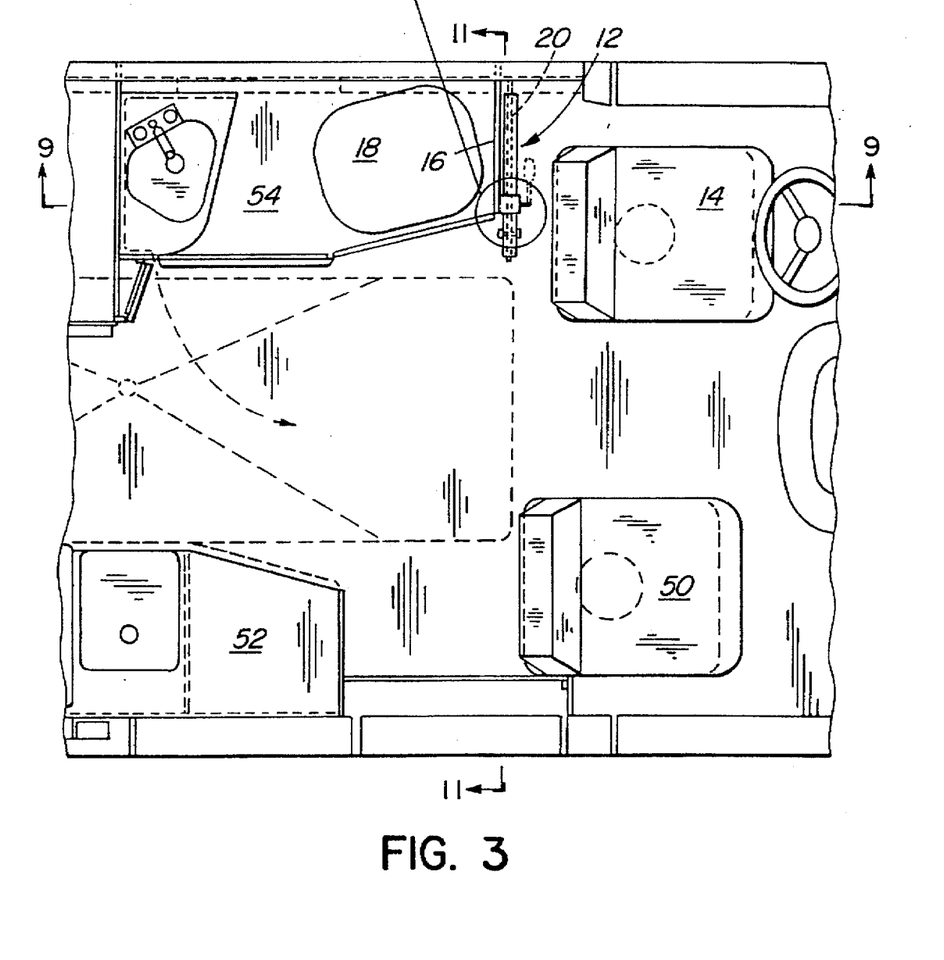
FIG. 3 is a partial top plan view of the front section of the van with the table blade in its stored position between the bathroom partition and the back of the drivers seat.
Figure 3A:
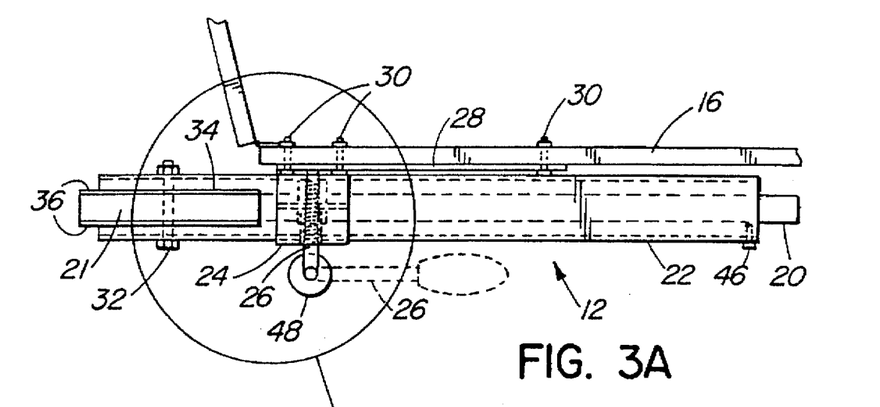
FIG. 3A is a top plan view of the table assembly (sliding tube and the clamping mechanism etc)

A table assembly 12 as seen in FIGS. 3 and 3A is in a vertically stored position, located behind the driver's seat 14 and secured to a partition 16 forwardly of toilet 18. The table assembly 12 includes a flat table blade 20 having an arcuate tab 21 integral therewith and extending from a corner of the otherwise rectangular table blade. A sliding tube 22 is disposed within a short clamping tube 24 having a crank handle and screw 26 mounted therein. A base plate 28, to which clamping tube 24 is fixed and which in turn is bolted at 30 to partition 16 is provided. A bolt 32 extends through the tab 21 of table blade 20 and retains the table blade 20 in a slot 34 in the end of sliding tube 22. This slot 34 and bolt 32 allow the table blade 20 to pivot relative to tube 22, as seen in FIGS. 4 to 8. Two disks 36, also in the slot 34 of the sliding tube 22, sandwich the tab 21 of table blade 20 for smoother pivoting and protection of the tab of the table blade 20 against excessive wear.

Figures 9, 9A:
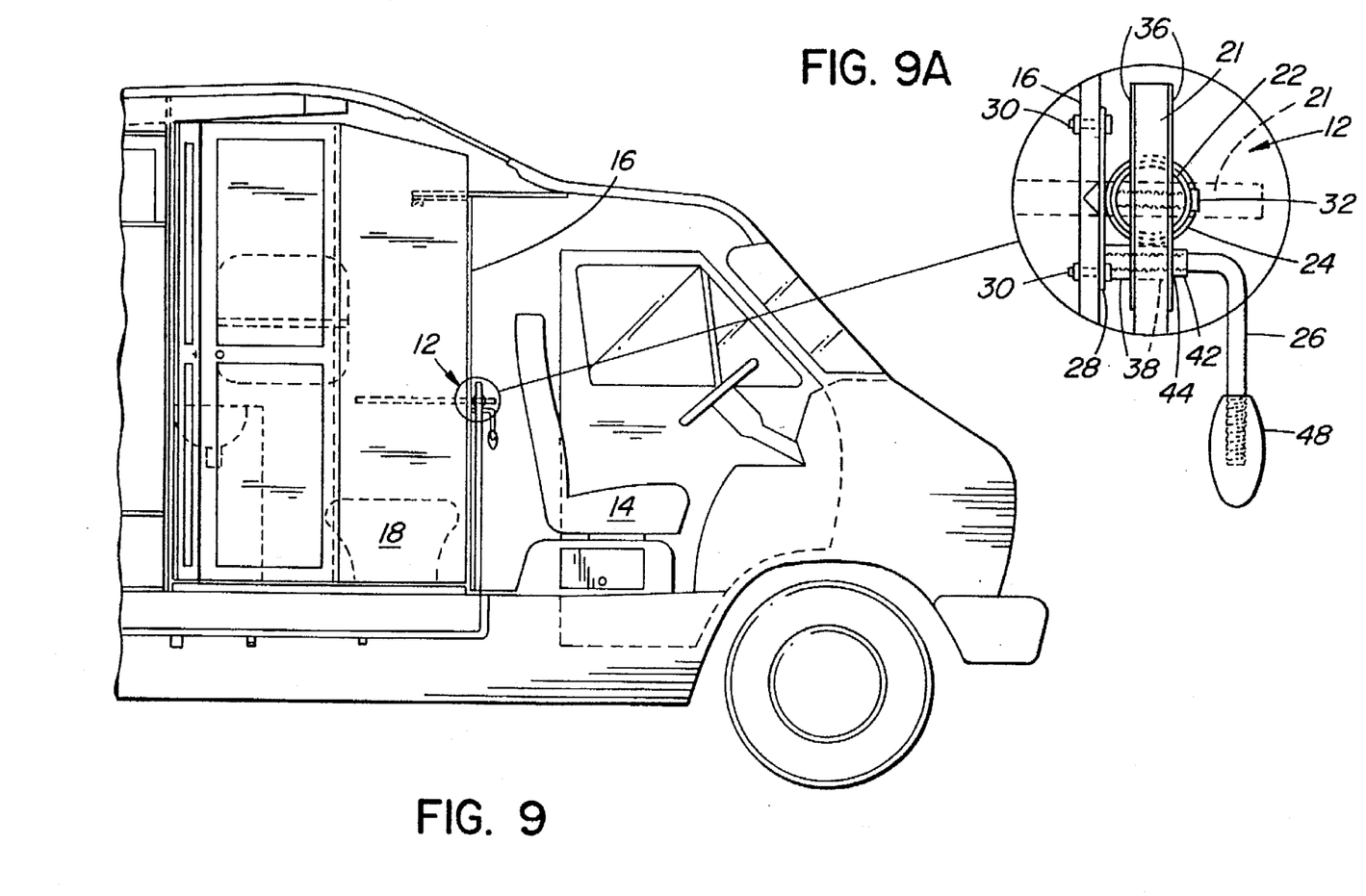
FIG. 9 is a lengthwise section as seen at line 9—9 in FIG. 3.
FIG. 9A is an enlarged insert showing the clamping mechanism of the tubing more clearly with the table assembly in the stored position.
Figure 10:
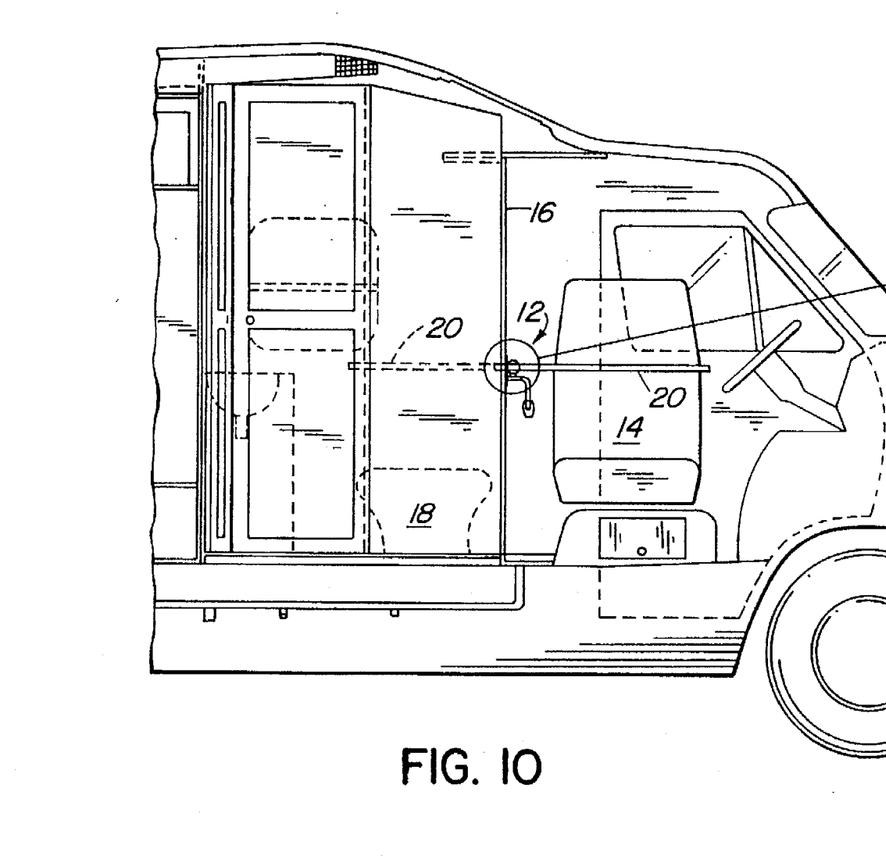
FIG. 10 is also a lengthwise section as seen in lines 10—10 in FIGS. 5 and 6.
Figure 10A:
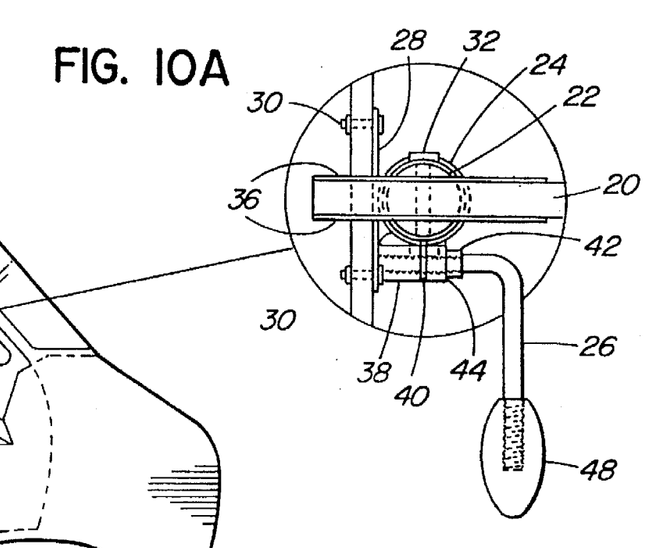
FIG. 10A is an enlarged insert showing the clamping mechanism of the tubing when the table blade is in the horizontal position.
Figure 11:
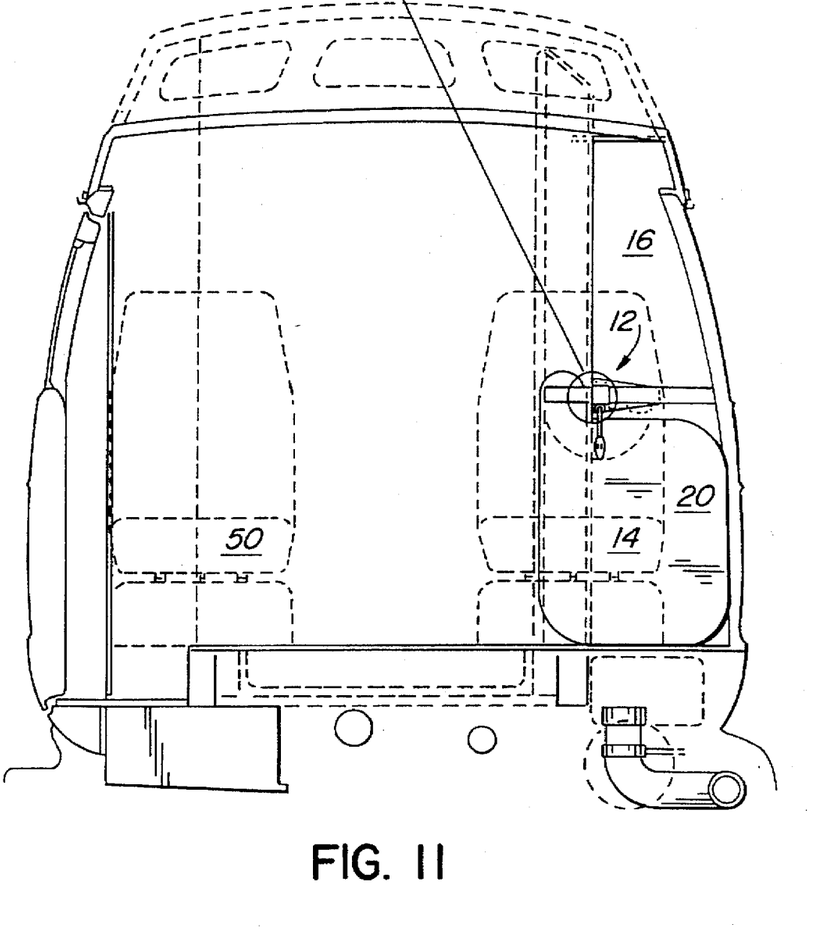
FIG. 11 is a cross section at line 11—11 as seen in FIG. 3.
Figure 11A:
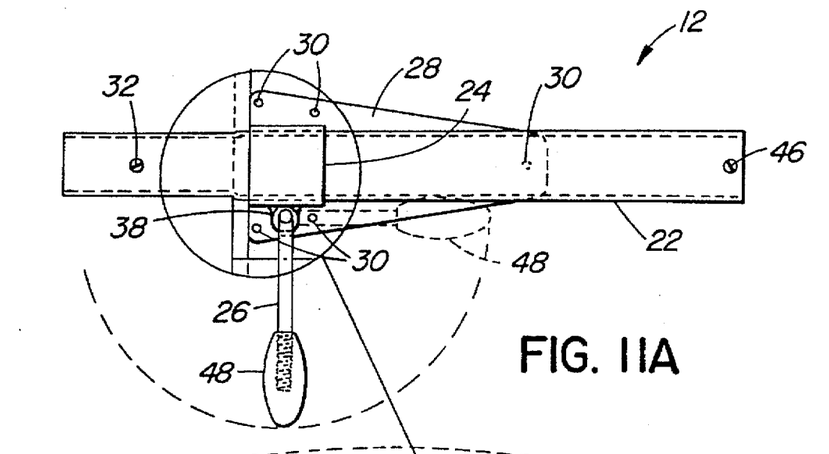
FIG. 11A is an enlarged insert showing the clamping mechanism of the tubing in greater detail when the table blade is in the vertically stored position.
Figure 12:
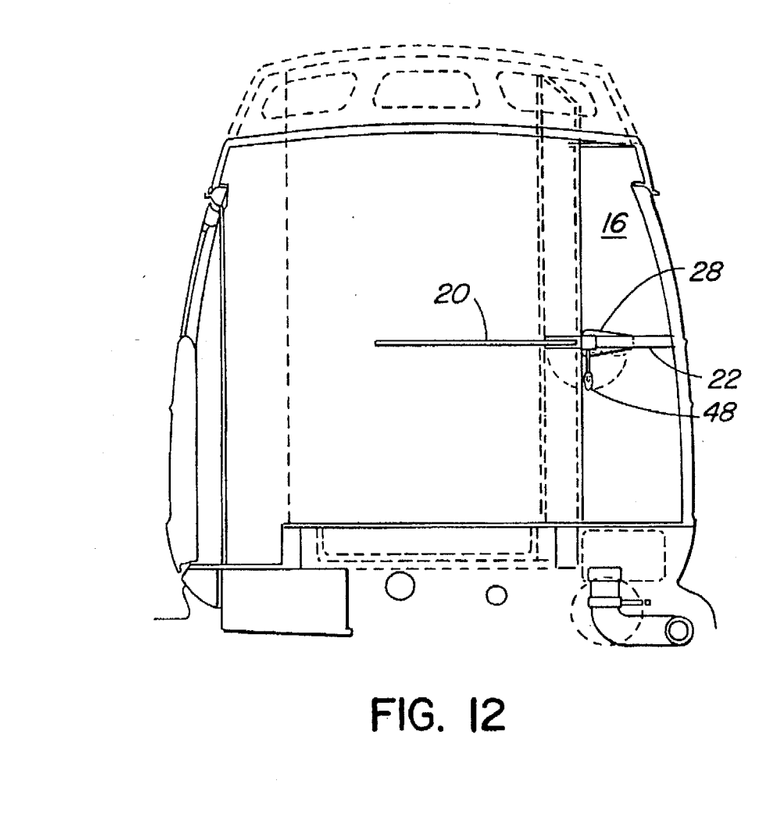
FIG. 12 is a cross section at line 12—12 as seen in FIG. 4.
Figure 13:
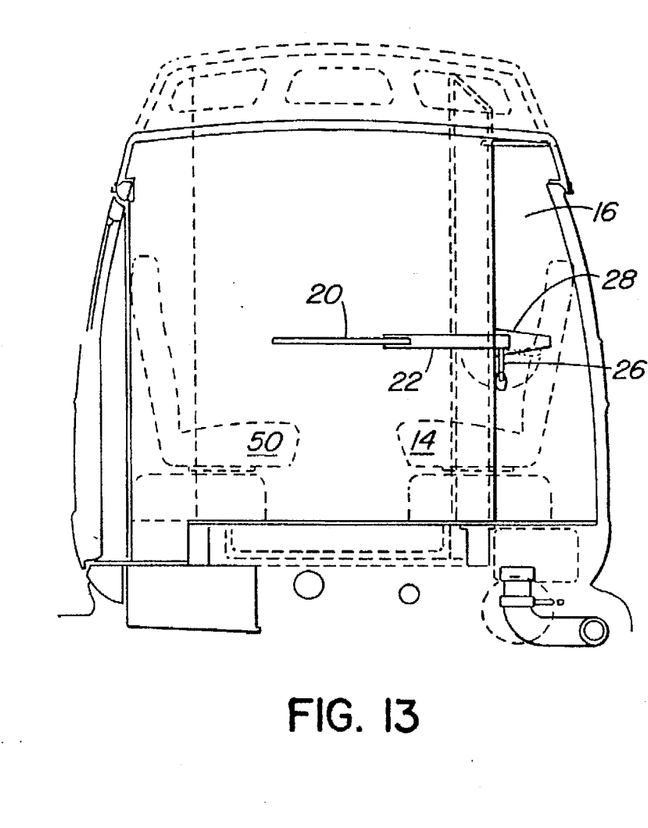
FIG. 13 is a cross section at line 13–13 as seen in FIG. 6.

A long internally threaded nut 38 is welded to the bottom of the short clamping tube 24 and extends transversely thereof and both the innermost end of long nut 38 and the short clamping tube 24 are welded to the face of base plate 28 (FIG. 9A). A narrow slot 40 extends lengthwise in the centre of the bottom of the short clamping tube 24 and transversely through the long nut 38 at the same time. The thread in the hole of the shorter outer part of the long nut 38 is drilled out to a dimension slightly larger than the diameter of the constant diameter externally threaded part of the handle and clamp screw 26 for free rotation thereof in said enlarged hole while at the same time the external threads on handle and clamp screw 26 engage the internal threads on the inner part of long nut 38. A suitable nut 42 is lodged at the terminal end of the threaded portion of handle and clamp screw 26. A washer 44 of suitable thickness is placed between nut 42 and the outer end of the short part of the long nut 38 for smoother low friction turning and to provide a downward pointing position of the crank portion of item 26 when the clamping tube 24 is tightened sufficiently around the sliding tube 22, (thereby also closing the narrow slot 40 in the bottom of clamping tube 24). A stop screw 46 prevents the sliding tube 22 from slipping out of the short clamping tube 24 when the sliding tube 22 is fully extended (toward the centre line of the van). The knob 48 secured to the end of the crank handle part of the crank handle and screw 26 makes for firm and good gripping when operated.

During use of the table assembly 12 the sliding tube 22 may be extended (pulled) towards the centre of the van, table blade 20 rotated to a horizontal position and the clamping tube 24 tightened by turning the crank handle and screw 26. The table blade 20 may be pivoted to any position about a vertical axis in a range of approximately 180 degrees. (Even with the sliding tube 22 retracted table blade 20 still can be pivoted 90 degrees). When the sliding tube 22 is partially or fully extended the table blade 20 can also be rotated about the axis of the slide tube 22 for 360 degrees. (The drivers seat 14 and passengers seat 50 are each capable of pivoting (swivelling) 360 degrees about their respective vertical support posts).

When table blade 20 is pivoted or rotated toward the front of the van and the drivers seat 14 and passengers seat 50 pivoted to positions facing one another, the persons occupying these seats 14 and 50, respectively, then have convenient use of said table blade 20. With the table blade 20 in the forward pointing position the person in the passenger seat 50 may rise in an unobstructed manner at any time. The person in the drivers seat 14 will simply pivot the table blade 20 towards the rear of the van upon rising and can proceed also in an unobstructed fashion between the passenger seat 50 and table blade 20 and past the kitchen counter 52 to the rear of the van or nearby bathroom 54.

Figure 1:
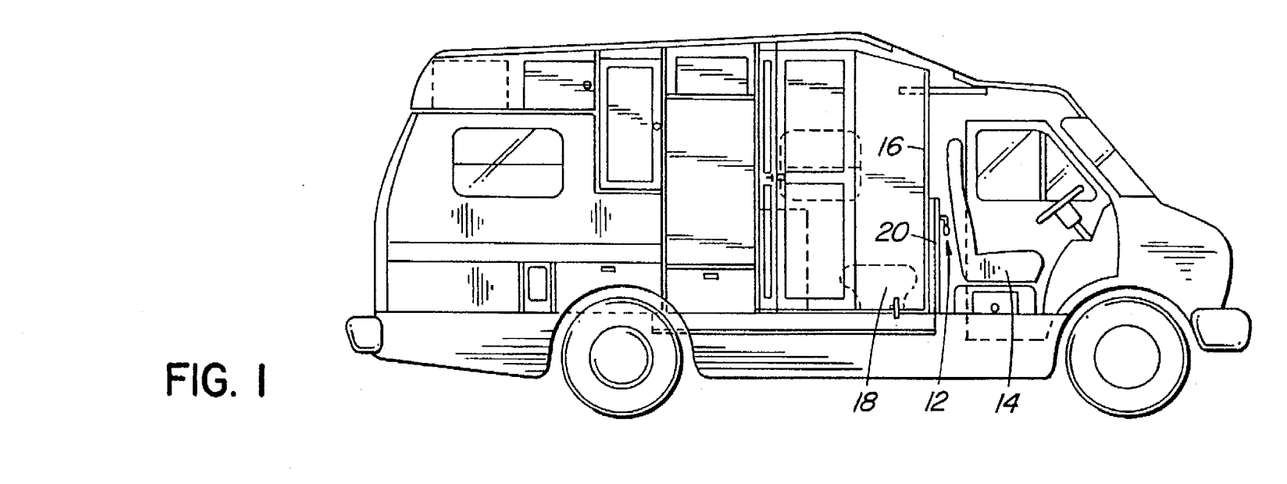
FIG. 1 is a lengthwise section through the van at line 1—1 as shown on FIG. 2, the table blade being stored along side the bathroom partition directly behind the drivers seat.

The operational features and advantages will be readily seen from a further review of the drawings. Hence, in FIGS. 1 and 2 the table blade 20 can be seen stored alongside the bathroom partition 16 directly behind the driver's seat 14. Again, in FIG. 3, with the table 20 in its stored position between the bathroom partition 16 and the back of the drivers seat 14, one side edge of the table blade 20 is shown against the van exterior wall when in this stored position.

This arrangement is a driving mode as both front seats 14, 50 face forwardly.

Figure 4:
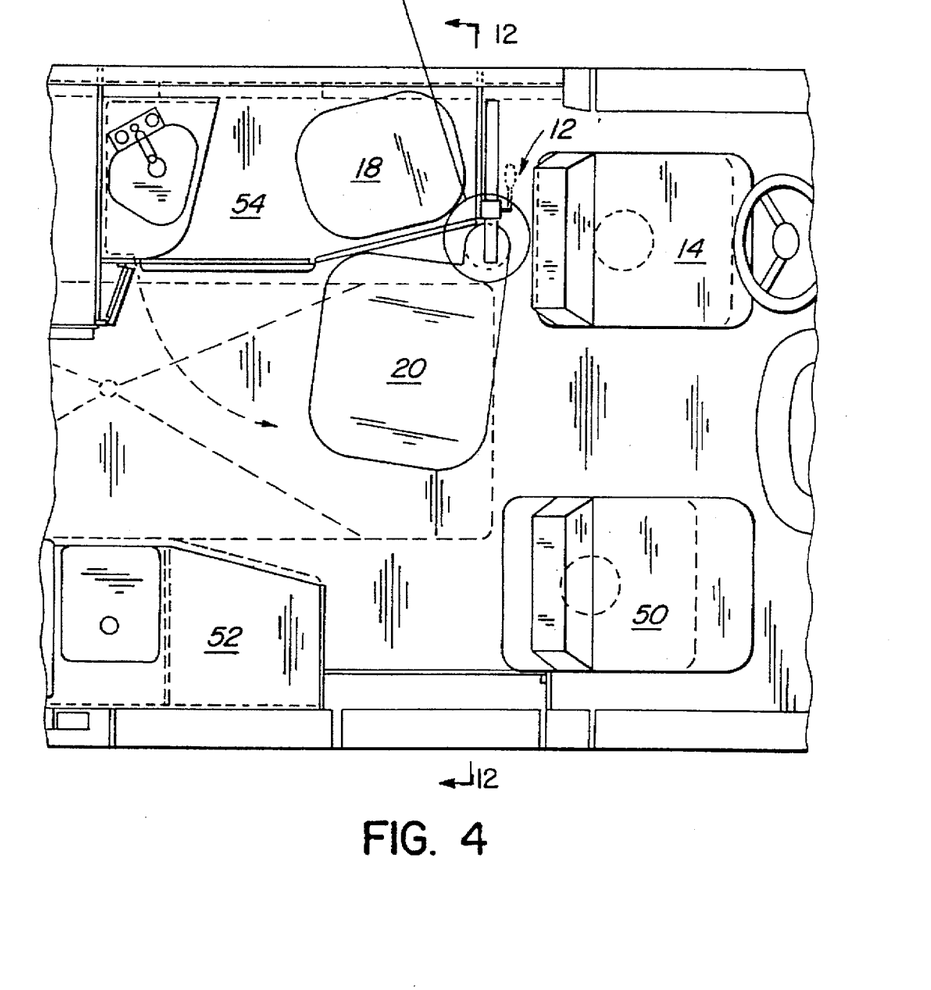
FIG. 4 is a similar view as in FIG. 3 but with the table blade pulled away from the exterior wall and rotated to a horizontal position in the aisle.
Figure 4A:
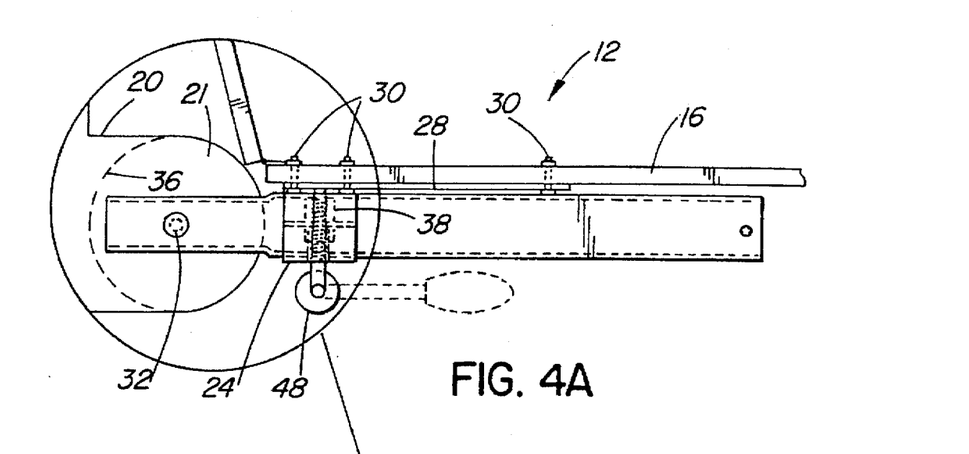
FIG. 4A is an enlarged top plan view of the table assembly as in FIG. 3A.

In FIG. 4 the table blade 20 is shown when pulled inwardly toward the centre of the van away from the exterior wall, rotated to a horizontal position and then located in the aisle 10d. This table blade position can be used during driving for maps, books and other flat things placed on non-slip rubber material covering the table blade top surface, which material is readily available in most RV supply stores for that express purpose. It must be noted that this position of the table blade 20 allows the passenger and the driver passage towards the van rear and the bathroom 54 (see dashed swing line of bathroom door) without repositioning the table blade 20. It is not even necessary to extend the sliding tube 22 in this position.

Figure 5:
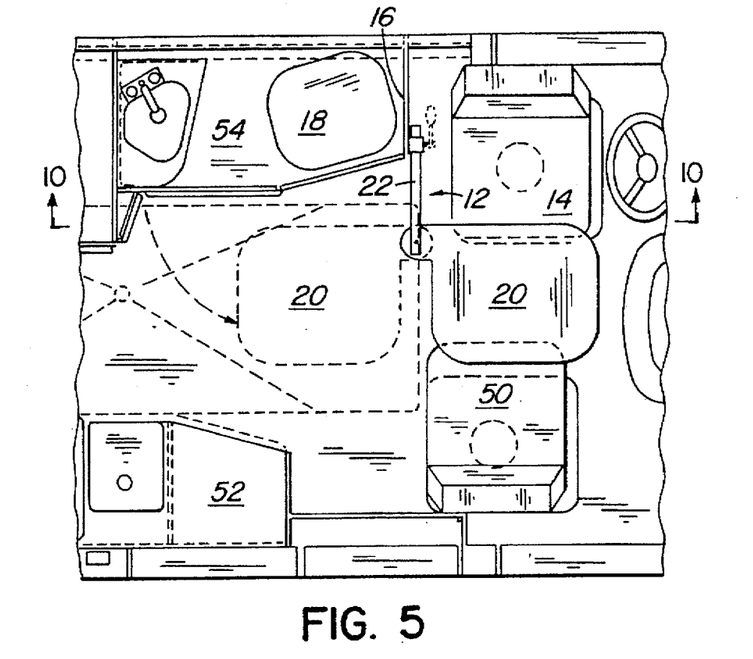
FIG. 5 is a similar view as in FIGS. 3 and 4 except that the sliding tube is partially extended towards the centre of the van and the table blade is pivoted forwards to a location between the drivers and passengers seats which are swivelled to face one another.

In FIG. 5 the sliding tube 22 is partially extended towards the centre of the van and the table blade 20 is pivoted forwardly to a location between the driver and passenger seats 14, 50 (which are swivelled to face one another). A person on the passenger seat 50 can get up at any time for service etc. or to let the person sitting on the driver's seat 14 get up. That person can simply lift and rotate the table blade 20 overhead into the aisle 10d (see dashed lines) and then has free passage past the passenger seat 50 and thence in between the table and kitchen counter 52 and also has access to the bathroom 54 without moving (pivoting) the table blade 20 at all, or perhaps very little. If one wants more entering room, this is accomplished very easily by simply giving the table blade 20 a little push towards the kitchen counter 52.

Figure 6:
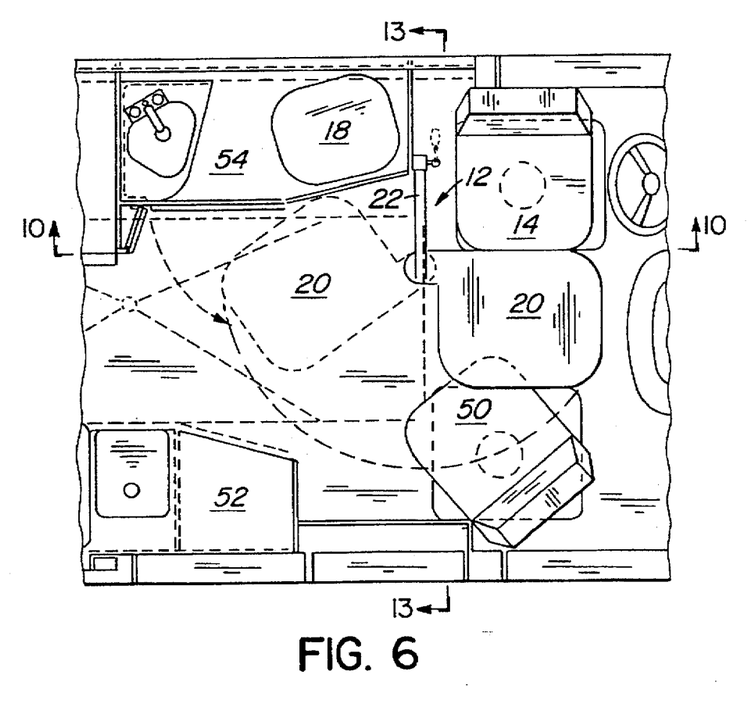
FIG. 6 is a similar view as in FIGS. 3 to 5 except that the sliding tube is fully extended, but again the table blade is pivoted forward to a location in between the drivers and passengers seats.

In FIG. 6 the sliding tube 22 is fully extended, and again the table blade 20 is pivoted forward to a position in between the drivers and passenger seats 14 and 50 respectively. The driver's seat 14 is seen swivelled and facing towards the centre of the van. The passenger seat 50 is seen swivelled to a 45 degree angled rearward facing position.

Figure 7:
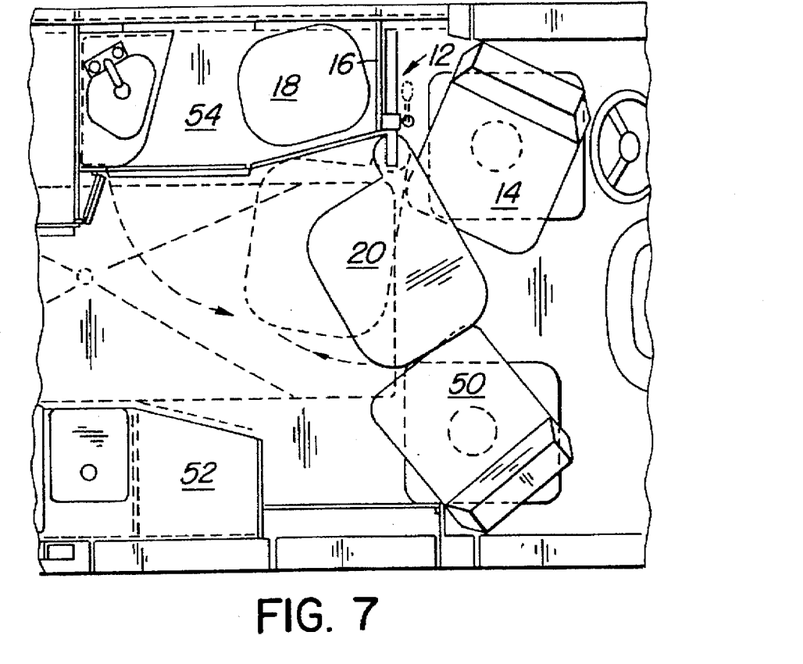
FIG. 7 is a similar view as in FIGS. 3 to 6, except that the sliding tube is not extended towards the centre of the van and the table blade and the two seats are in a somewhat rearward facing angled position in relation to the exterior walls.

FIG. 7 is similar to FIGS. 5 and 6 except that the sliding tube 22 is not extended towards the centre of the van and the table blade 20 and the two seats 14, 50 are in a somewhat rearward facing angled position in relation to the exterior walls. This position allows for more room to relax and watch a TV (not shown) which would be partially extended (turned and facing somewhat forwards) from under the kitchen counter 52 without blocking the aisle 10d. The person in the passenger seat 50 may get up at any time to move unobstructedly towards the rear. The person in the driver's seat 14 merely pivots the table blade 20 in the direction of the arrow towards the rear, as shown in dashed lines, in order to get up and pass between the table blade 20 and passenger seat 50 and kitchen counter 52 to get to the rear. This position also provides plenty of room to enter the bathroom 54 without pivoting the table blade 20 back towards the front of the van.

Figure 8:
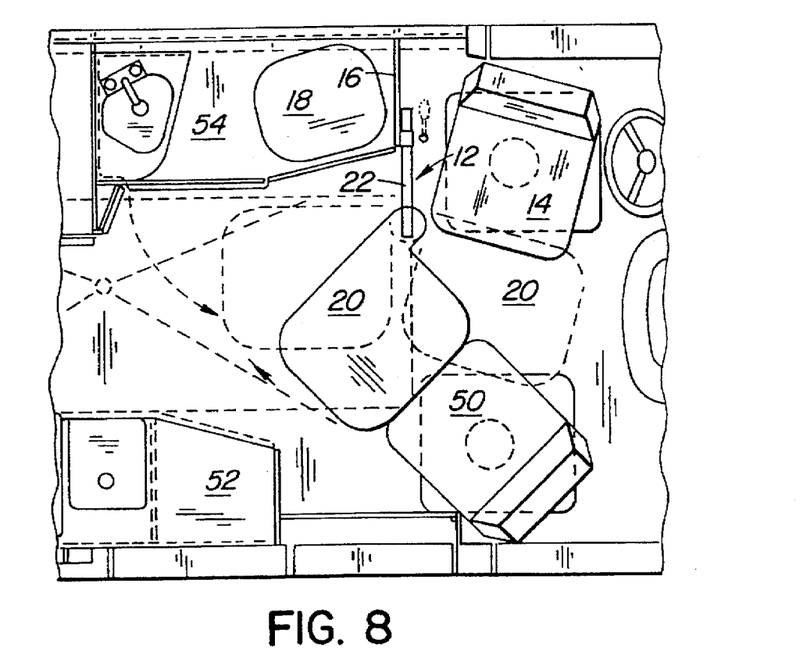
FIG. 8 is a similar view as in FIGS. 3 to 7, except that the sliding tube is partially extended towards the centre of the van and the table blade and the two seats (as in FIG. 7) are in an angled position in relation to the exterior walls.

FIG. 8 is similar to FIGS. 4 to 7 except that the sliding tube 22 is only partially extended towards the centre of the van and the table blade 20 and the two seats 14, 50 (as in FIG. 7) are in angled positions in relation to the exterior walls. This table blade 20 position, as shown in solid lines, allows the person in the passenger seat 50 to use the table exclusively for writing or other chores. If the person in the driver's seat 14 wants such exclusive use, one merely rotates the table blade 20 overhead and pivots same to a position in front of the angled drivers seat 14, as shown in the longer dashed lines. For access to the rear of the van one merely pivots the table blade 20, from either of those two positions, towards the rear to a position as shown in the short dashed lines provided it is rotated back from where it was in front of the driver's seat 14 position. However, this should not be absolutely necessary because if the table blade 20 is not rotated back to a position as more or less shown in FIG. 7, it would then allow one more room to enter the bathroom 54.

It will be appreciated that the table blade 20 and seats 14, 50 may be extended, pivoted and/or rotated or swivelled, respectively, to many more incremental (at any degree) positions than are shown in FIGS. 3 to 8, which are just a few examples.

A preferred embodiment of the invention has been described and illustrated by way of example. Those skilled in the art will realize that various modifications and changes may be made while still remaining within the spirit and scope of the invention. Hence the invention is not to be limited to the embodiment as described but, rather, the invention encompasses the full range of equivalencies as defined by the appended claims.

I claim:

1. A movable table assembly for use in a recreational vehicle and comprising a table blade and a mounting assembly therefor enabling said table blade to be extended and retracted and to be pivoted and rotated about vertical and horizontal axes as desired in order to bring said table blade from a stored position to any one of a plurality of desired positions for use and vice versa and wherein said mounting assembly includes an elongated member to one end of which said table blade is pivotally mounted for movement about a first axis relative to said elongated member, and said elongated member being mounted to a support base for both rectilinear and rotational movement relative thereto to desired positions along and about the longitudinal axis of said elongated member, and means for securing said elongated member relative to said support base in said desired positions.

2. The movable table assembly of claim 1 wherein said first axis about which said table blade is mounted is normal to said longitudinal axis of the elongated member.

3. The movable table assembly of claim 2 wherein said table blade is mounted in an end portion of said elongated member.

4. The movable table assembly of claims 1 wherein said elongated member has a cylindrical exterior and said means for securing comprises a clamping sleeve surrounding part of said elongated member and means to tighten said clamping sleeve around said elongated member, said clamping sleeve being fixed to said support base.

5. The movable table assembly of claim 4 wherein said support base is adapted to be mounted to a panel.

6. The movable table assembly of claim 1 in combination with a recreational vehicle, said mounting assembly being secured to a fixed interior portion of said vehicle.

7. The combination of claim 6 wherein said recreational vehicle has a frontal driving/seating section having at least a drivers seat and a passenger seat therein, and said table assembly being located to one side of said vehicle such that said table blade may be brought into any of said desired positions for use by occupants of said drivers and/or said passengers seats, both the drivers seat and passengers seat being mounted for rotation about respective vertical swivel axes.

8. The combination of claim 7 wherein said mounting assembly is secured to a panel or partition positioned to enable said extension and retraction to take place along an axis generally transverse to the longitudinal axis of the vehicle interior such that said table blade may be moved from a stored position parallel to said panel or partition to any one of a plurality of horizontal positions adjacent said seats for convenient use by one or both occupant(s) thereof.

* * * * *